(12) United States Patent
Gistau-Baguer (10) Patent No.: US 7,234,324 B2
(45) Date of Patent: Jun. 26, 2007

(54) METHOD AND INSTALLATION FOR CONTROLLING AT LEAST ONE CRYOGENIC CENTRIFUGAL COMPRESSOR COMPRESSION LINE

(75) Inventor: Guy Gistau-Baguer, Biviers (FR)

(73) Assignee: L'Air Liquide, Société Anonyme à Directoire et Conseil de Surveilance pour l'Étude et l'Exploitation des Procédés Georges Claude, Paris (FR)

( * ) Notice: Subject to any disclaimer, the term of this patent is extended or adjusted under 35 U.S.C. 154(b) by 454 days.

(21) Appl. No.: 10/515,510

(22) PCT Filed: May 16, 2003

(86) PCT No.: PCT/FR03/01501

§ 371 (c)(1),
(2), (4) Date: Nov. 19, 2004

(87) PCT Pub. No.: WO03/100332

PCT Pub. Date: Dec. 4, 2003

(65) Prior Publication Data

US 2005/0178134 A1 Aug. 18, 2005

(30) Foreign Application Priority Data

May 24, 2002 (FR) .................... 02 06326

(51) Int. Cl.
*F25J 3/00* (2006.01)
*F25B 1/00* (2006.01)

(52) U.S. Cl. .................... 62/657; 62/228.3; 62/228.4

(58) Field of Classification Search ............. 62/608, 62/613, 619, 657, 228.1, 228.3, 228.4
See application file for complete search history.

(56) References Cited

U.S. PATENT DOCUMENTS

| 5,265,426 | A | 11/1993 | Gistau-Baguer |
| 5,499,505 | A | 3/1996 | Gistau-Baguer |
| 5,941,095 | A | 8/1999 | Gistau-Baguer |
| 6,755,620 | B2 * | 6/2004 | Nakamura et al. ............. 417/2 |

FOREIGN PATENT DOCUMENTS

| FR | 2 760 074 | 1/1993 |
| FR | 2 679 635 | 8/1998 |

OTHER PUBLICATIONS

International Search Report for PCT/FR 03/01501.

* cited by examiner

*Primary Examiner*—Marc Norman
(74) *Attorney, Agent, or Firm*—Christopher J. Cronin (57) ABSTRACT

Methods and apparatuses for controlling systems of cryogenic centrifugal compressors. A predetermined curve in the form of a first parameter as a function of a second parameter is selected. The first parameter represents the rotational speed of a compressor, and the second parameter represents the mass for rate of that compressor. The speed of rotation of a downstream compressor is regulated according to the value of the suction pressure of an upstream compressor and a variable set pressure. The variable set pressure is regulated according to both actual value of the first parameter for a downstream compressor, and the theoretical value of this parameter. The theoretical value is determined from a pre-determine curve using the value of the second parameter.

34 Claims, 9 Drawing Sheets

METHOD AND INSTALLATION FOR CONTROLLING AT LEAST ONE CRYOGENIC CENTRIFUGAL COMPRESSOR COMPRESSION LINE

BACKGROUND

The invention applies for example to the cooling of superconducting components of particle accelerators.

The pressures discussed here are absolute pressures.

The cooling of the superconducting components of particle accelerators requires the use of a fluid in equilibrium at low temperature and at low pressure, particularly helium, of which the vaporization provides the necessary heat transfers.

The refrigeration installations used in these applications comprise liquefaction units which, using helium gas at atmospheric pressure and ambient temperature, are able to supply liquid helium in equilibrium with its gas phase at temperatures of about 2K and at pressures of about 30 mbar.

The power dissipated by the superconducting components vaporizes helium, which must be recompressed in order to be recycled to the liquefaction unit, of which the inlet pressure is set at a value in the range of atmospheric pressure. The role of the compression line is to control its own inlet pressure and hence the liquid helium temperature.

At present, only compression lines with centrifugal compressors in series are suitable for compressing, at the desired compression ratio, a sufficient flow rate for obtaining medium or high refrigeration capacities. The centrifugal compressors are accordingly dimensioned to provide the desired compression ratio for the nominal mass flow rate of helium gas vaporized by the superconducting components operating at full capacity.

During startup, waiting periods, or the operation of the superconducting components at reduced capacity, the cooling requirements decrease, and this is accompanied by a commensurate reduction of the mass flow rate of helium gas vaporized and introduced into the compression line. This decrease in the mass flow rate is liable to cause stalling of the compressors, which must provide a constant compression ratio.

In the case of compressors operating at ambient temperature, the above problem is solved simply by adjusting the flow rate of each compressor. For this purpose, each compression stage is provided with a recycle line, which can be used to increase the mass flow rate of each compressor, and thereby to prevent its stalling.

However, this solution cannot be applied to cryogenic compressors mounted in series, because the solution whereby gas is recycled between each compression stage in order to adjust the operating point of each compressor would require intermediate coolings, would prove to be extremely complicated to implement, and would remove cooling capacity from the refrigerator.

Such cryogenic compressors are also subject to specific contingencies, which must be taken into account for their control.

Thus, given that this concerns a cryogenic system, the temperature of each of the compression stages is variable.

Furthermore, given that the flow treated by the compressors is sent to a refrigerator, the latter imposes a flow rate limitation, corresponding to the flow rate which it can accept.

Moreover, the control process is not time-dependent. In fact, the flow rate of gas to be treated results from the evaporation of a portion of liquid, for which the pressure is decreased, this flow rate being obtained by appropriately varying the suction pressure of the first compression stage.

Such a variation is linked to the various parameters of the liquid, on which the pumping is carried out, that is, in particular, the quantity, superheat state, or the residual power dissipated in this liquid.

SUMMARY

Considering the above factors, it is an object of the invention to propose a method allowing the reliable control of at least one centrifugal cryogenic compressor, and which in particular makes it possible, at any time, to bring each compressor to a stable state, which can nonetheless be different from its nominal state.

The present invention relates to a method and an installation for controlling at least one cryogenic centrifugal compressor, as well as a corresponding compression line and refrigeration installation.

The invention applies, for example, to the cooling of superconducting components of particle accelerators.

For this purpose, one subject of the invention is a method for controlling a compression line comprising at least one cryogenic centrifugal compressor, said line being able in particular to compress a gas initially at low temperature and at low pressure, in particular helium, arriving from a vessel, method in which the speed of rotation of the or each compressor is controlled, characterized in that it comprises the following steps:

a predetermined curve is selected, which can be represented in the form of a first parameter representative of the speed of rotation of a compressor, as a function of a second parameter, representative of the mass flow rate of said compressor;

the speed of rotation of the cryogenic centrifugal compressor disposed furthest downstream of the compression line is regulated as a function of the relative values, on the one hand, of the instantaneous pressure at the inlet of the cryogenic centrifugal compressor located furthest upstream of the compression line and, on the other, of a variable pressure setpoint; and the variable pressure setpoint is regulated as a function of the value of the ratio between, on the one hand, the instantaneous value, for the downstream compressor, of the first parameter representative of the speed of rotation of the compressor and, on the other, the theoretical value of this first parameter, situated on said predetermined curve, which corresponds to the instantaneous value, for this downstream compressor, of the second parameter representative of the mass flow rate.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

According to other features of the invention:

the parameter representative of the speed of rotation is the reduced-reduced speed.

the parameter representative of the mass flow rate is the reduced-reduced flow rate.

in a representation which includes the compression ratio as a function of the reduced-reduced flow rate, the predetermined curve defines a second predetermined curve which is situated to the right of a stalling curve of the compressor.

the second predetermined curve passes through the nominal operating point.

for a given compression ratio, the distance between the second predetermined curve and the stalling curve is proportional to the value of the compression ratio.

the variable pressure setpoint is regulated by regulating an attenuation coefficient, and by multiplying this attenuation coefficient by a fixed value in order to obtain said variable pressure setpoint.

the fixed value is equal to a desired pressure value at the inlet of the upstream compressor, in particular 30 mbar.

the variable pressure setpoint is increased when the instantaneous value, for the downstream compressor, of the parameter representative of the speed of rotation, is less than the theoretical value.

the speed of rotation of the downstream cryogenic centrifugal compressor is increased when the instantaneous pressure at the inlet of the upstream cryogenic centrifugal compressor is higher than the variable pressure setpoint.

a downstream compressor is provided as well as at least one other compressor and a speed of rotation is assigned to the or to each other compressor, corresponding to the theoretical value, for each other compressor, of the first parameter representative of the speed of rotation, this value being situated on the predetermined curve and corresponding to the instantaneous value of the second parameter, representative of the mass flow rate.

a downstream compressor is provided as well as at least one other compressor and, at least during a startup phase of said compressor, a speed of rotation is applied to the or to each other downstream compressor, corresponding to the product of the speed of rotation of the downstream compressor and a predetermined coefficient.

after the or each cryogenic centrifugal compressor has reached its nominal speed, energy is supplied, particularly electrical, in the vessel, when the distance between an instantaneous operating point and the stalling curve becomes less than a preset minimum value.

a fraction of gas is recycled from downstream to upstream of the compression line via a recycle line, the flow rate actually sent downstream of this line, particularly to a liquefaction unit of this gas, is measured, and the gas flow in the recycle line is regulated as a function of the relative values, on the one hand, of the flow rate actually sent downstream of the compression line and, on the other, of a threshold flow rate, which corresponds in particular to a flow rate that is acceptable as regards this liquefaction unit.

auxiliary gas is injected at a temperature substantially higher than that of the gas flowing in the compression line, in particular at ambient temperature, and the injection of this auxiliary gas is regulated as a function of the relative values, on the one hand, of the gas flow rate downstream of the compression line and, on the other, of a threshold flow rate, corresponding in particular to a flow rate that is acceptable as regards a liquefaction unit of this gas.

A further subject of the invention is an installation for controlling a compression line comprising at least one cryogenic centrifugal compressor, for the putting into practice of the method as described above, characterized in that it comprises:

first regulating means, able to regulate the speed of rotation of the cryogenic centrifugal compressor located downstream of the compression line, as a function of the relative values, on the one hand, of the instantaneous pressure at the inlet of the cryogenic centrifugal compressor situated upstream of the compression line and, on the other, of a variable pressure setpoint; and second regulating means, able to regulate the variable pressure setpoint as a function of the value of the ratio between, on the one hand, the instantaneous value, for the downstream compressor, of the first parameter of the predetermined curve, representative of the speed of rotation of the compressor and, on the other, the theoretical value of this first parameter, situated on this predetermined curve, which corresponds to the instantaneous value, for the downstream compressor, of the second parameter of this predetermined curve, representative of the mass flow rate of the compressor.

According to other features of the invention:

the speed regulating means comprise a first regulation loop which has a setpoint equal to the variable pressure setpoint, a measurement, equal to the pressure at the inlet of the upstream cryogenic centrifugal compressor, and an output able to regulate the speed of the downstream cryogenic centrifugal compressor.

the means for regulating the variable pressure setpoint comprise a second regulation loop, having a setpoint equal to 1, a measurement equal to the ratio between the instantaneous and theoretical values of the first parameter, and an output able to modify the value of this variable pressure setpoint.

the output of the second regulation loop terminates in a multiplication module able to multiply the value of this output by a fixed value.

this fixed value is equal to a pressure value desired at the inlet of the upstream compressor, in particular 30 mbar.

the installation further comprises at least one computation module able to calculate at any time, for the or for each compressor, the instantaneous and theoretical values of the first parameter, representative of the speed of rotation, and the instantaneous value of the second parameter, representative of the mass flow rate.

the installation comprises means able to supply energy, particularly electrical, to the vessel, when the distance between the operating point and the stalling curve becomes less than a preset minimum value.

the installation comprises an energy regulating loop, having a setpoint equal to said preset minimum value, a measurement linked to another computation module, able to calculate, at any time, the distance between the operating point and the stalling curve, and an output linked to the energy supply means.

the installation comprises a recycle line, able to recycle a fraction of gas from downstream to upstream of the compression line, and flow regulating means, able to regulate the gas flow in this recycle line as a function of the relative values, on the one hand, of the flow rate actually sent downstream of the compression line and, on the other, of a threshold flow rate.

the flow rate regulating means comprise a recycle flow regulating loop having a setpoint equal to the threshold flow rate, a measurement corresponding to the instantaneous value of the rate of flow actually sent downstream of the compression line, and an output linked with an open-shut member, in particular a valve, with which the recycle line is equipped.

the installation comprises a line for injecting an auxiliary gas at a temperature substantially higher than that of the gas flowing in the compression line, in particular at ambient temperature, and injection regulating means, able to regulate the injection of this auxiliary gas as a function of the relative values, on the one hand, of the flow rate of the gas flowing downstream of the compression line and, on the other, of a threshold flow rate.

the injection regulating means comprise an injection regulating loop having a setpoint equal to the value of the threshold flow rate, a measurement equal to the instantaneous value of the gas flow rate flowing downstream of the compression line, and an output linked with an open-shut member, in particular a valve, with which the injection line is equipped.

A further subject of the invention is a compression line comprising at least one cryogenic centrifugal compressor, and an installation for controlling the or each compressor, characterized in that this control installation conforms to the above description.

A final subject of the invention is an installation for refrigeration by vaporization of a liquefied gas at low pressure and low temperature, particularly helium, comprising a vessel containing a two-phase fluid at low temperature and at low pressure, a unit for liquefaction of this gas, a feed line for two-phase fluid at low temperature and at low pressure, equipped with means for expanding this liquefied gas, connecting the liquefaction unit to the vessel, and a line for compressing the gas phase connecting the vessel to the liquefaction unit, characterized in that the compression line conforms to the above description.

Figure 1:
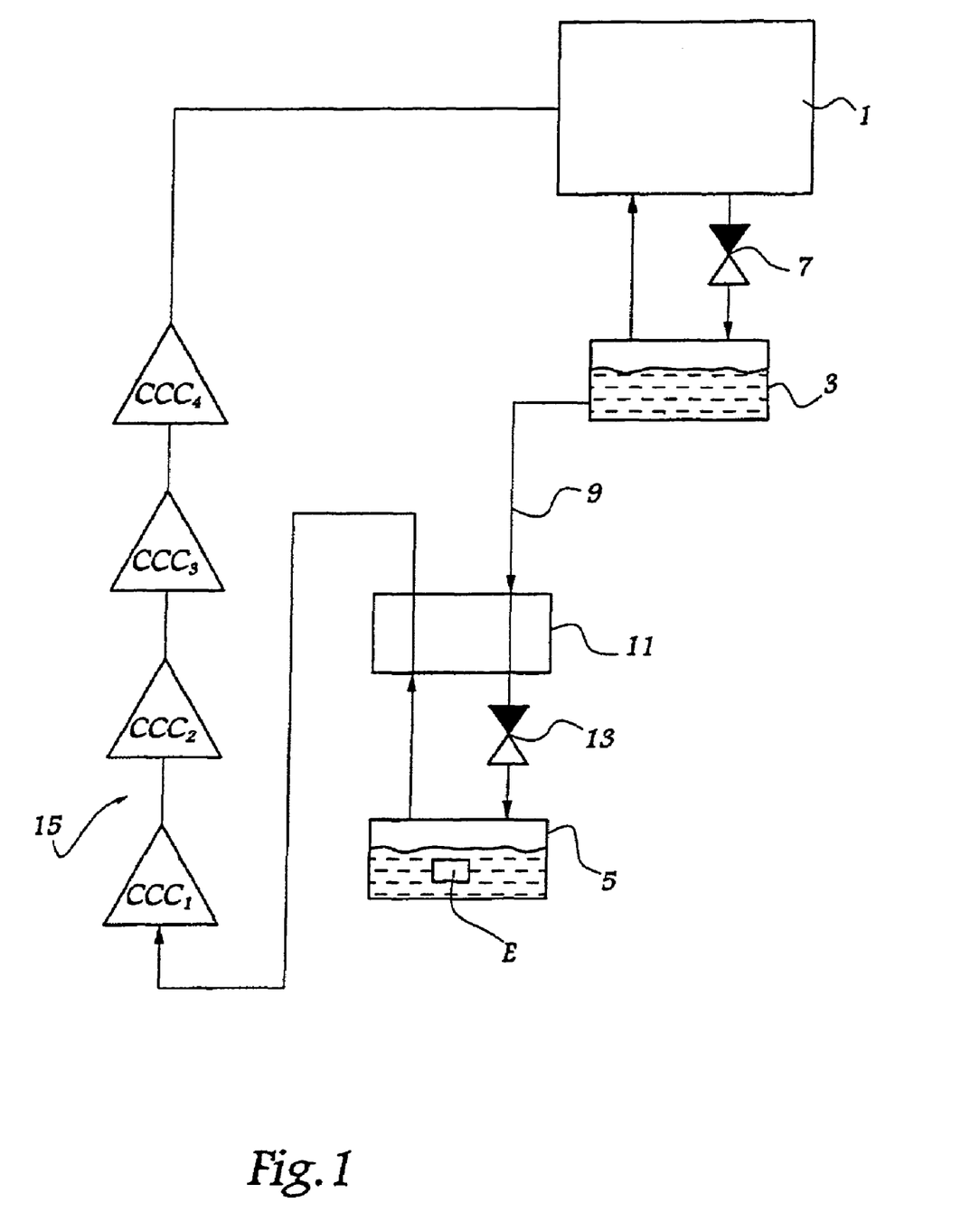
FIG. 1 illustrates a schematic view of several cryogenic centrifugal compressors.

FIG. 1 shows an installation for refrigeration by liquid helium, used for example for cooling superconducting components of particle accelerators.

This installation comprises a helium liquefaction unit 1, or refrigerator, comprising compressors, heat exchangers and expansion means, not shown. Also provided is a first vessel 3 for storing liquid helium in equilibrium with its gas phase, and a second vessel 5 for storing liquid helium in equilibrium with its gas phase, which provides the heat exchanges with the component E to be refrigerated.

The helium liquefaction unit 1, after expansion in a pressure reducing valve 7, delivers liquid helium in equilibrium with its gas phase to the first vessel 3. In operation, the helium is then at a temperature of about 4.4 K and at a pressure of about 1.2 bar.

The liquid of the first vessel 3 is extracted via a line 9, cooled in a heat exchanger 11, then expanded in a pressure reducing valve 13 before being introduced in equilibrium with its gas phase into the second vessel 5. In operation, the helium in this vessel must be at a temperature of about 2K and at a pressure of about 31.3 (mbar) (or hPa).

The gas overhead of the second vessel 5 is aspirated, after countercurrent heating in the heat exchanger 11, into a compression line 15 which returns the helium gas into the liquefaction unit 1.

The discharge pressure of the compression line is in imposed by the liquefaction unit 1 at a value of about 1.15 bar. In operation, the compression line is able to lower the equilibrium pressure and hence the equilibrium temperature of the helium in the second vessel 5 to the desired value.

Such a refrigeration installation is described in documents FR-A-2 679 635 and U.S. Pat. No. 5,499,505.

The compression line shown in FIG. 1 comprises four cryogenic centrifugal compressors mounted in series, which are assigned the numerals $CCC_1$ to $CCC_4$.

The following parameters will be used for an easier description of the operation of the compressors:

"reduced" flow rate of a compressor: $Y = D \times \sqrt{T}/P$

"reduced" speed of a compressor; $n = N/\sqrt{T}$ where D is the mass flow rate through the compressor, T the compressor inlet temperature, P the compressor inlet pressure and N the compressor speed of rotation, "reduced-reduced", or, "reduced-normed" flow rate of a compressor; $X = Y/Y_N$ and "reduced-reduced", or "reduced-normed" speed of a compressor; $NU = n/n_N$ where $Y_N$ is the nominal "reduced" flow rate of the compressor, that is in operating conditions corresponding to those of its design, and $n_N$ is the nominal "reduced" speed of the compressor, that is in operating conditions corresponding to those of its design.

Figure 2:
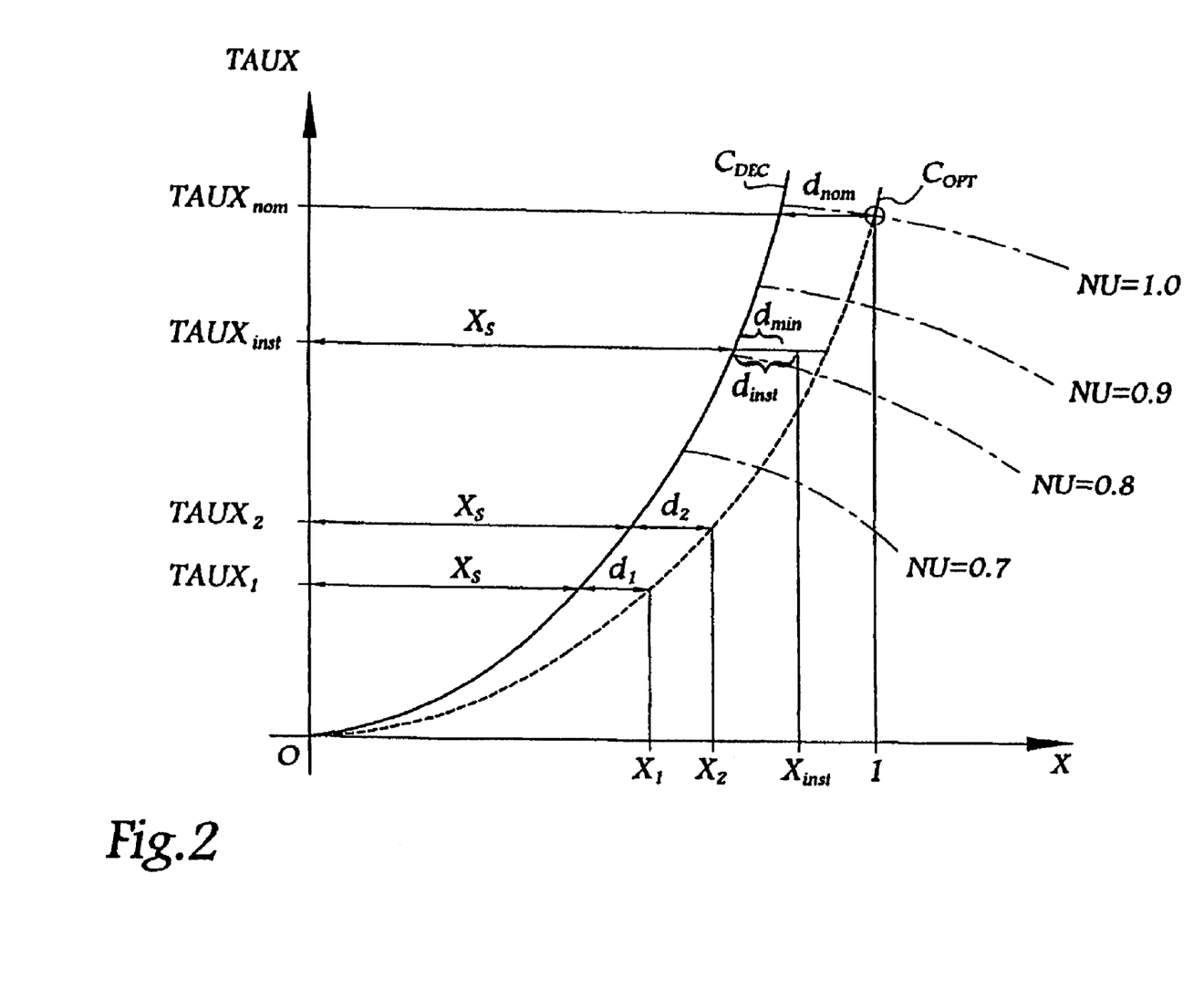
FIG. 2 illustrates a graphical representation of a typical compression field for a cryogenic centrifugal compressor.

The graph in FIG. 2 shows the compression field of a centrifugal compressor in a "reduced-reduced" flow rate/compression ratio plane.

The curve $C_{DEC}$ of stalling in the impeller vanes, shown by solid lines, divides the compression field of the compressor into a stable operating zone to the right of the stalling curve, and an unstable operating zone to the left of the stalling curve.

Thanks to the use of "reduced-reduced" variables, this curve $C_{DEC}$ makes it possible to analyze the operation of a compressor in conditions other than those defined for the nominal speed, and also to compare the operation of different compressors, which do not necessarily have identical fields.

By reference to the graph in FIG. 2, an optimal path is defined, which each compressor is presumed to follow, thanks to the control method of the invention.

This optimal path $C_{OPT}$, which is shown by dotted lines, is situated to the right of the stalling curve. It passes through the point ($Taux_{nom}$; 1), symbolized by a circle which corresponds to a nominal operating point, for example defined by the operator.

This optimal path is the locus, passing through the above point ($Taux_{nom}$; 1) of the operating points situated at a "similar" or "proportional" distance from the stalling curve. This means that the distance between the operating point of the compressor and the stalling curve, which is proportional to the compression ratio, is defined by the same ratio $(X-X_s)/X_s$ on the field of each compressor, this ratio also being called the distance coefficient.

Under these conditions, since the sensitivity to stalling increases with the compression ratio, the distance between the stalling curve and the optimal path at constant compression ratio is defined as follows: $((X-X_s)/X_s) \times (Taux/Taux_{Nom})$.

This distance varies from 0 for a compression ratio of 1, to its maximum value $d_{NOM}$, corresponding to the nominal compression ratio $Taux_{NOM}$. By referring to FIG. 2, it is thus equal to $d_1=(X_1-X_s/X_s) \times (Taux_1/Taux_{NOM})$ and to $d_2=(X_2-X_s/X_s) \times (Taux_2/Taux_{NOM})$, for given respective points $X_1$ and $X_2$.

Figure 3:
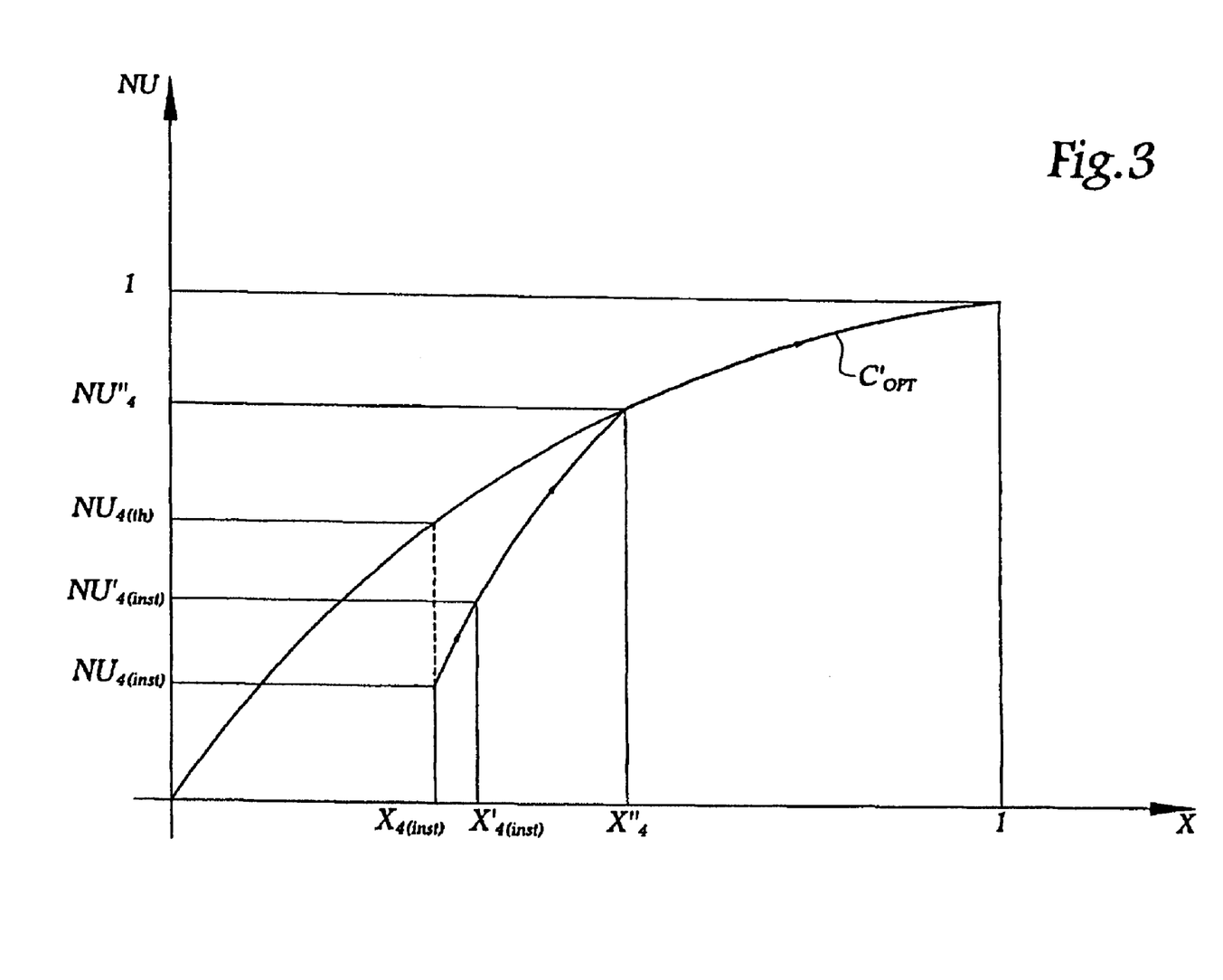
FIG. 3 illustrates a graphical representation of one embodiment of the optimal behavior, according to the current invention, for a cryogenic centrifugal compressor.

As shown in FIG. 3, the optimal path $C_{OPT}$ of FIG. 2 can be shown in the form of another graph. On this graph, the reduced-reduced flow rate X is plotted on the x-axis, while the reduced-reduced speed NU is plotted on the y-axis.

This optimal path $C'_{OPT}$, in its form NU=f(X) varies from the point (0; 0) corresponding to a compressor at rest, to the point (1; 1) which corresponds to the nominal operation of this compressor.

Figure 4:
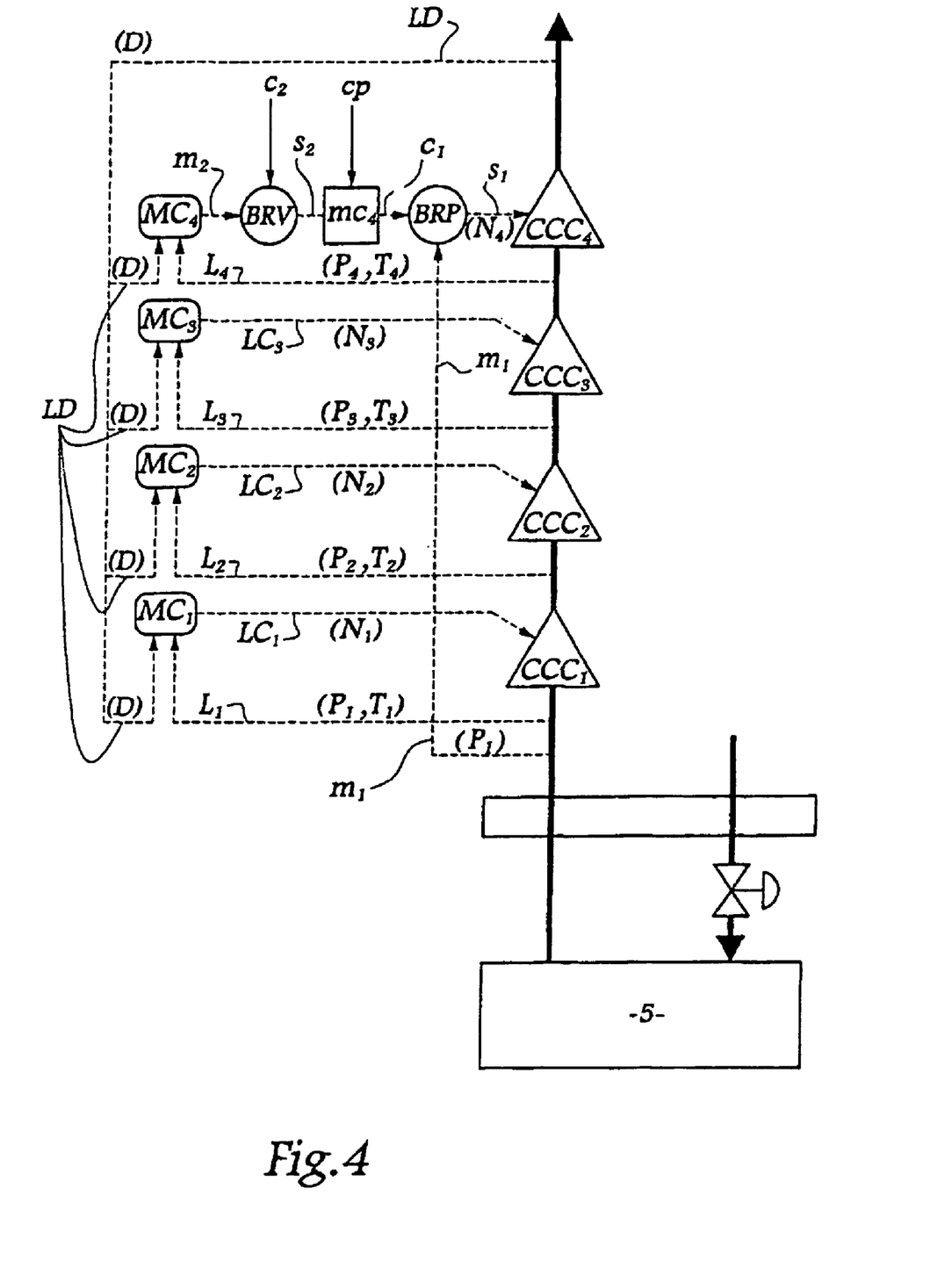
FIG. 4 illustrates a schematic view of a first embodiment, according to the current invention, for controlling the compressor system of FIG. 1.

FIG. 4 shows an installation for controlling the train of centrifugal cryogenic compressors shown in FIG. 1.

This installation comprises a pressure regulation loop BRP. This loop receives, via the line $m_1$, the measurement of the suction pressure of the first cryogenic compressor $CCC_1$.

Moreover, the setpoint applied to this regulation loop, which is symbolized by the line $c_1$, is described in greater detail below. Finally, the output $s_1$ of this loop BRP is linked to the downstream compressor $CCC_1$, in order to vary its speed of rotation.

A speed regulation loop BRV is also provided. Three lines, assigned respectively the numerals $m_2$, $c_2$ and $s_2$, represent the measurement, the setpoint, and the output of this second regulation loop.

The installation further comprises four computation modules $MC_1$, $MC_2$, $MC_3$ and $MC_4$, each of which is connected to a corresponding compressor $CCC_1$ to $CCC_4$.

The module $MC_1$ is connected to sensors of the inlet pressure $P_1$ and of the inlet temperature $T_1$ of the compressor $C_1$, via a line $L_1$. Similarly, the modules $MC_2$, $MC_3$ and $MC_4$ are connected to sensors of the inlet pressure $P_2$ to $P_4$ and the inlet temperature $T_2$ to $T_4$ of the compressors $CCC_2$ to $CCC_4$, via lines $L_2$ to $L_4$.

A sensor of the mass flow rate D of gas flowing in the compression line is connected to each of the computation modules $MC_1$ to $MC_4$, via a line LD. These various computation modules each comprise computation and data storage means.

The module $MC_4$ calculates the coordinates $X_4$ (inst) and $NU_4$(inst) at any time, from the values measured by the various associated sensors, relative to the flow rate, the temperature and the pressure.

The module $MC_4$ also calculates, for this given $X_4$ (inst), the theoretical value $NU_4$ (th), situated on the optimal path $C'_{OPT}$ in FIG. 3.

The values of $X_4$ (inst), $NU_4$ (inst) and $NU_4$ (th) are plotted in FIG. 3.

The module $MC_4$ also calculates the ratio $NU_4(inst)/NU_4$ (th), then sends the corresponding result to the regulation loop BRV, via the line $m_2$.

Furthermore, the regulation loop BRV compares this measurement $m_2$ to the setpoint $c_2$, which is in this case equal to 1. The value of the output $s_2$, which constitutes an attenuation coefficient, is then adjusted accordingly.

This output $s_2$ is sent to an additional computation module $mc_4$, which performs the multiplication between this attenuation coefficient $s_2$ and a fixed pressure setpoint, symbolized by the line cp. This fixed setpoint corresponds to the target pressure upstream of the first compressor $CCC_1$, that is for example 30 mbar.

The product $s_2*cp$ thus obtained constitutes the setpoint $c_1$ of the pressure regulation loop BRP. It is accordingly important to note that this setpoint $c_1$ is variable, or "floating".

Furthermore, each of the computation modules $MC_1$ to $MC_3$ calculates the coordinates of the points ($X_i$ (inst); $NU_i$(inst)) at any time, i varying from 1 to 3, for each compressor $CCC_1$ to $CCC_3$. In a similar manner as described above for $MC_4$, these modules calculate the values of $NU_i$(th), which correspond to the values of NU situated on the optimal path, for each of the $X_i$(inst).

The control of the train of compressors in FIG. 1 will now be explained, with reference to FIGS. 3 and 4.

It is assumed that, at any given time, the coordinates of the operating point of the downstream compressor $CCC_4$ are ($X_4$(inst); $NU_4$(inst)), as shown on the graph in FIG. 3.

Under these conditions, $NU_4$(inst) is lower than $NU_4$(th), situated on the optimal path $C'_{OPT}$. In consequence, the ratio $NU_4$ (inst)/$NU_4$ (th), which constitutes the measurement $m_2$, is less than 1.

This measurement $m_2$ of the speed regulation loop BRV is hence lower than its setpoint $c_2$, which is equal to 1, so that the output signal $s_2$ is increased. This tends to increase the value of the setpoint $c_1$ of the pressure regulation loop BRP.

The speed of rotation $N_4$ of the compressor $CCC_4$ is then increased commensurately, via the output signal $s_1$. The volumetric flow rate of gas created by this compressor $CCC_4$ is also increased, together with its compression ratio.

This is accordingly accompanied by a commensurate decrease in the suction pressure $P_4$ of the downstream compressor $CCC_4$, accompanied by an increase in the discharge gas temperature.

Finally, the value of the reduced-reduced flow rate $X_4$ increases. This increase in the reduced-reduced flow rate, and that of the reduced-reduced speed $NU_4$, is symbolized on the graph in FIG. 3 by the next operating point ($X'_4$(inst); $NU'_4$(inst)), situated to the top right of the preceding operating point ($X_4$(inst) $NU_4$(inst)), that is closer to the optimal path.

Since the various regulation loops BRP and BRV act continuously, the curve $x4=f(NU_4)$ progressively approaches the optimal path $C'_{opt}$, greeting it at a point ($X''_4$; $NU''_4$), shown in FIG. 3.

When the operating curve meets the optimal path, the measured value of $NU_4$ and the theoretical value of $NU_4$ become equal, so that the speed regulation loop BRV is deactivated. The setpoint $c_1$ of the pressure regulation loop BRP is hence maintained at a constant value.

Furthermore, if the measurement $m_1$ of this loop, that is the suction pressure $P_1$ of the compressor $CCC_1$, does not vary, the mass flow rate treated by the compressor decreases, as well as the reduced-reduced flow rate $X_4$. Thus, the curve $NU_4=f(X_4)$ meets the operating point (1; 1), substantially along a thicker portion of the curve, situated at the upper portion of the optimal path $C'_{OPT}$ in FIG. 3.

This means that the speed of rotation of the compressor $C_4$ will increase until it reaches the nominal speed, which corresponds to a pressure $P_1$ of 30 mbar. This makes it necessary to perform a speed adjustment, for these nominal conditions, which is explained below.

We shall now return to the action of the regulation loops BRV and BRP, on the upstream compressors $CCC_1$ to $CCC_3$.

We have shown that, on the one hand, the downstream compressor $CCC_4$ defines, at any time, the mass flow rate which enables it to operate satisfactorily.

We have also shown that the computation modules $MC_1$, $MC_2$ and $MC_3$ calculate at any time, the values of NU making it possible to locate on the optimal path $C'_{OPT}$ for each compressor. In this case, these values are $NU_1(th)$, $NU_2(th)$ and $NU_3(th)$.

Under these conditions, each computation module $MC_1$ to $MC_3$ controls a corresponding compressor $CCC_1$ to $CCC_3$, assigning to it the speeds $N_1(th)$ to $N_3(th)$ which correspond to the theoretical values of NU presented immediately above. This is achieved via the control lines $LC_1$ to $LC_3$.

Figure 5:
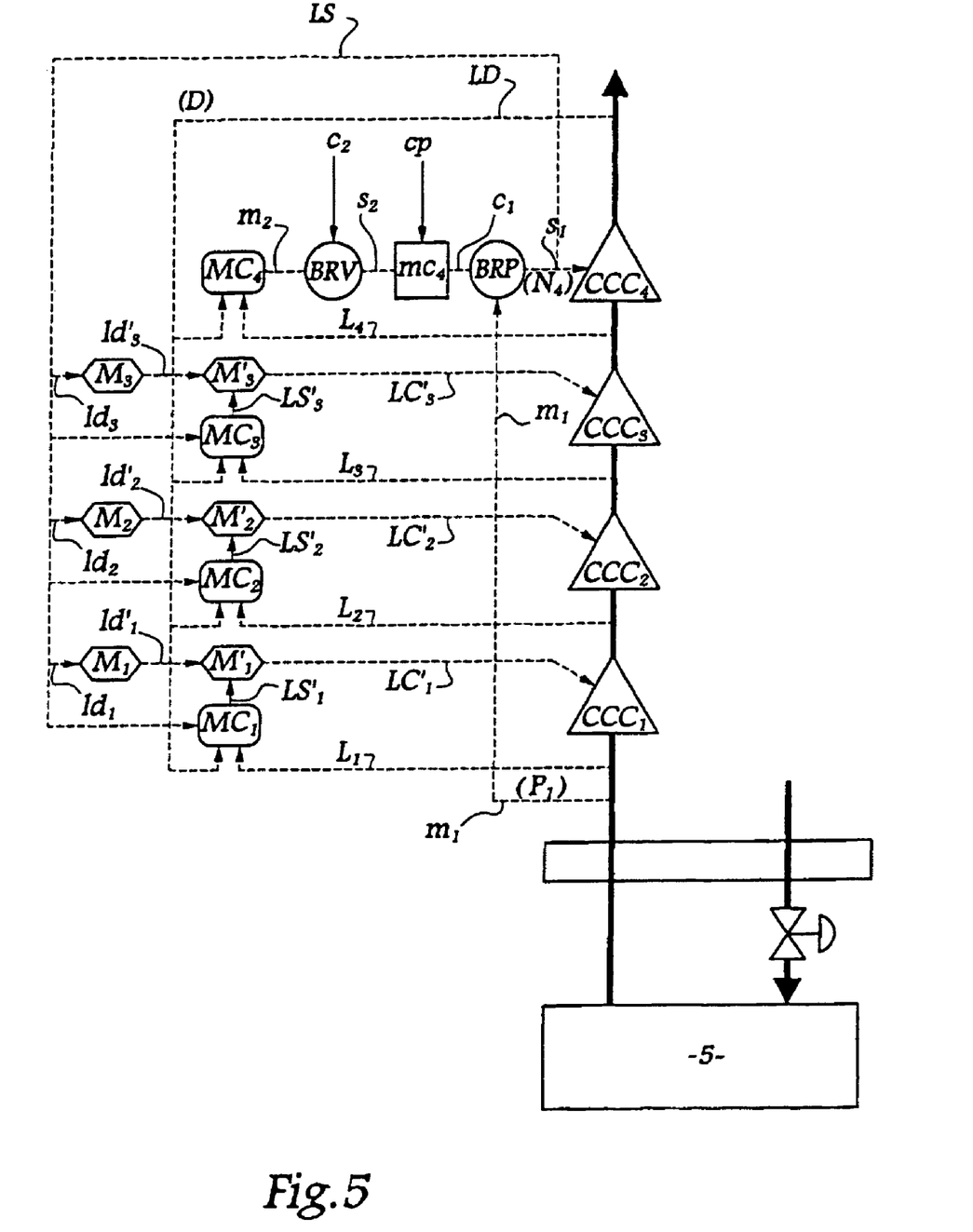
FIG. 5 illustrates a schematic view of a second embodiment, according to the current invention, for controlling the compressor system of FIG. 1.

FIG. 5 shows a variant of the installation in FIG. 4. This variant comprises all the elements in FIG. 4, as well as additional means pertaining to the control of the upstream compressors $CCC_1$ to $CCC_3$.

In this FIG. 5, the computation modules $MC_1$ to $MC_3$ receive, in a similar manner as described above, data enabling them to calculate the instantaneous values of $X_1$ to $X_3$, as well as the respective instantaneous and theoretical values of $NU_1$ to $NU_3$.

An additional control line LS is also provided, connecting the output of the pressure regulation loop BRP to each of the computation modules $MC_1$ to $MC_3$. This line LS is provided with branch connections $ld_1$ to $ld_4$, each of which is sent to a corresponding multiplication module $M_1$ to $M_3$.

Each module $M_1$ to $M_3$ performs the multiplication, by a given coefficient $a_1$, $a_2$, or $a_3$, of the signal transmitted via the line LS, that is the speed of rotation $N_4$ which is applied to the downstream compressor $CCC_4$. Under these conditions, the lines $ld'_1$ to $ld'_3$, situated downstream of the modules $M_1$ to $M_3$ transmit signals representative of the products $(N_4*a_1)$, $(N_4 \times a_2)$ and $(N_4 \times a_3)$.

Furthermore, lines $LS'_1$ to $LS'_3$ issue from each computation module $MC_1$ to $MC_3$. These lines transmit the following products, for i=1 to 3: $N_i(th)/(a_i \times N_4)$.

As explained above, the values of $N_i(th)$ are situated on the optimal path in FIG. 3.

The lines $ld_1$ to $ld_3$, as well as $LS'_1$ to $LS'_3$, terminate in pairs in additional multiplication modules $M'_1$ to $M'_3$. Each of these modules carries out the multiplication between the data transmitted via the different lines, or, for i=1 to 3: $(N_4 \times a_i) \times N_i(th)/N_4 \times a_i$.

The corresponding product, which is equal to $N_i$ (th), is then sent to the compressors $C_1$ to $C_3$, via the respective control lines $LC'_1$ to $LC'_3$.

The use of these various multiplication modules $M_1$ to $M_3$, and of $M'_1$ to $M'_3$, is advantageous in the sense that the times for computation of the adjustment by the modules $MC_1$, $MC_2$ and $MC_3$, which can be long depending on the speed of the central processor, accordingly have a reduced effect on the quality of control.

Figure 6:
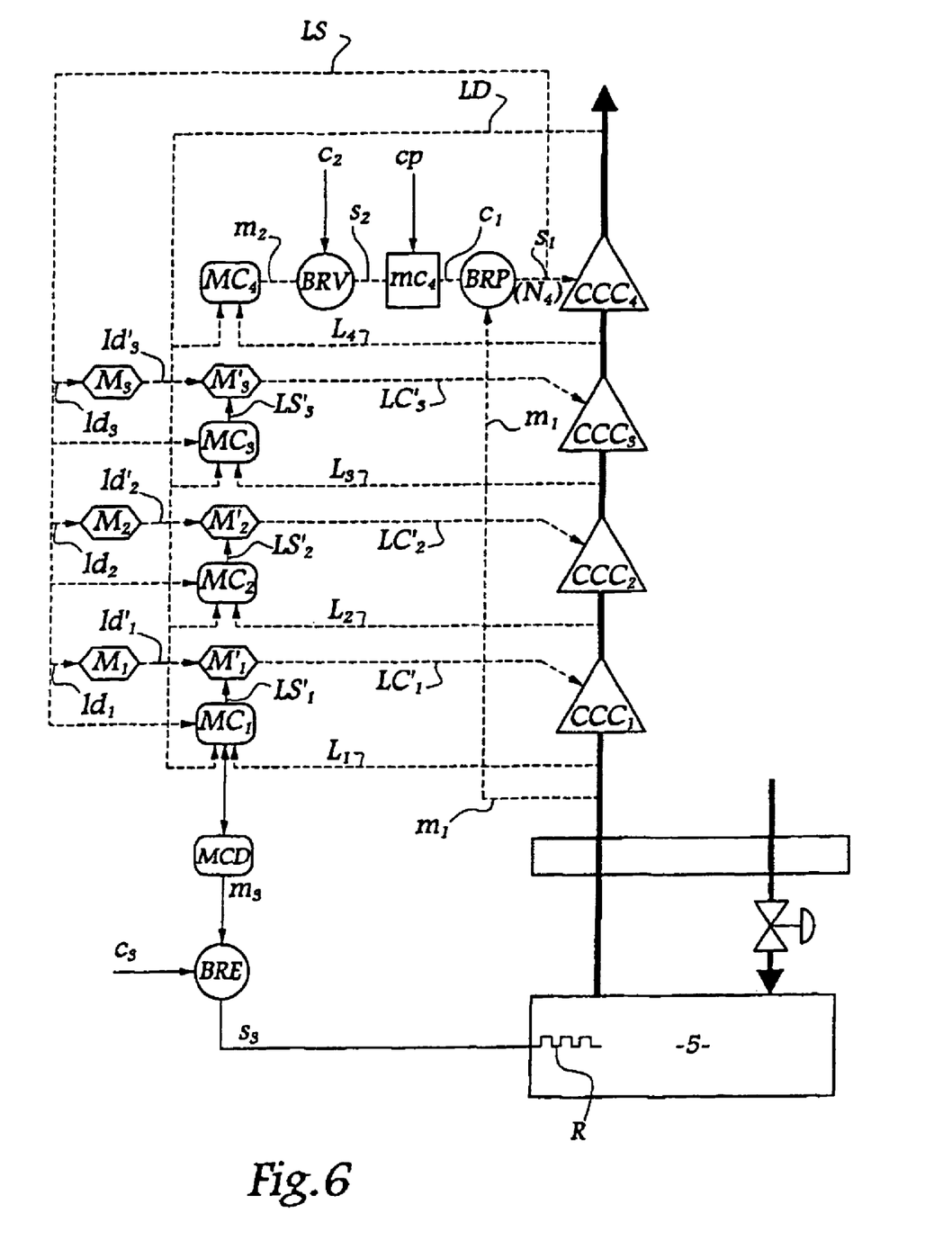
FIG. 6 illustrates a schematic view of a third embodiment, according to the current invention, for controlling the compressor system of FIG. 1.

FIG. 6 shows a variant of FIG. 5. This variant comprises all the means in FIG. 5, as well as additional means corresponding to the operation of the compressors under nominal conditions.

When the pressure $P_1$ reaches the target value, for example 30 mbar as shown above, the speeds of the various compressors tend towards fixed values.

In consequence, in the absence of additional measurement, the mass flow rate of gas transported by the compressors is reduced, so that the operating points tend to approach the stalling curve $C_{DEC}$, shown in FIG. 2.

Furthermore, it is inconceivable to accelerate the various compressors. In fact, if this were the case, the pressure $P_1$ would fall below the above objective value.

The solution to this problem is provided by the installation in FIG. 6.

FIG. 6 shows an energy regulation loop BRE, of which the measurement $m_3$ line arrives from a computation module MCD. This module permanently calculates the distance between the instantaneous operating point and the stalling curve, for any of the compressors of the train, for example, as shown, the compressor $CCC_1$.

By again referring to FIG. 2, this instantaneous distance d(inst) corresponds to the value: $((X(inst)-Xs)/Xs) \times (Taux(inst)/Taux_{NOM})$.

Furthermore, the setpoint $c_3$ of the loop BRE corresponds to a minimum, or so-called safety distance, above which any operating point must be situated. This minimum distance, symbolized by reference $d_{MIN}$ in FIG. 2, is for example equal to 50% of the distance between the stalling curve $C_{DEC}$ and the optimal path $C_{OPT}$.

Finally, the output $S_3$ of the regulation loop BRE is sent to an electrical energy supply means disposed in the bath 5. This is for example a resistor R, with the understanding that any means for supplying energy, other than electrical, can be considered.

In service, when the operating point of the compressor $CCC_1$ approaches too close to the stalling curve $C_{DEC}$, the regulation loop BRE injects power into the helium bath 5. This causes the vaporization of a commensurate quantity of helium, making it possible to increase the mass flow rate of gas flowing in the compressors, thereby guaranteeing that the operating point deviates from the stalling curve.

Figure 7:
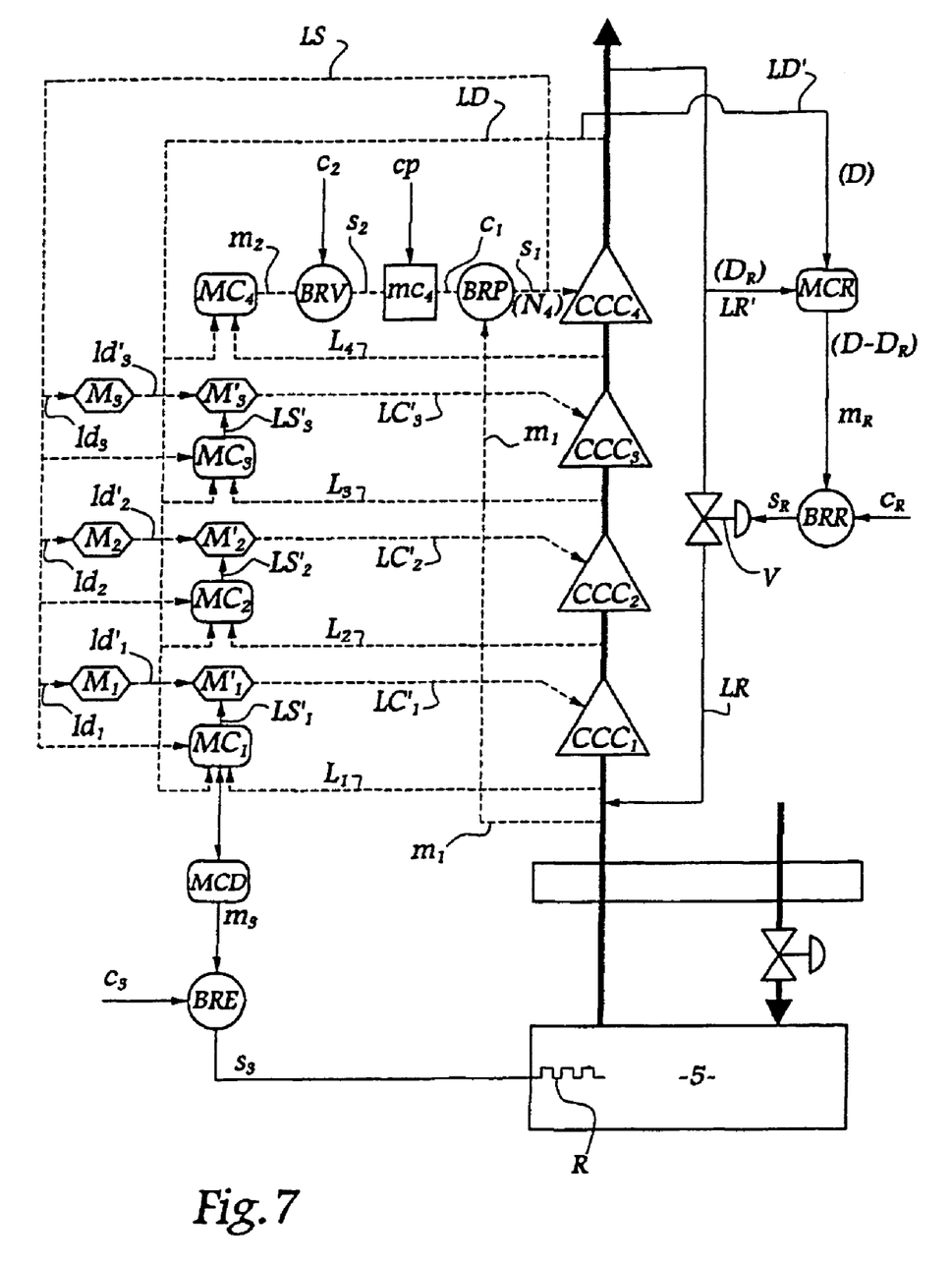

FIG. 7 shows a variant of FIG. 6, relative to the gas pressure reducing phase.

During such a pressure reduction, the compressors treat a maximum flow rate of gas, which is higher than the value of the nominal flow rate. Under these conditions, such a flow rate is sometimes higher than a limit value acceptable as regards the refrigerator 1, to which this helium gas is sent.

As shown in FIG. 7, a recycle line LR is provided, provided with a valve V which extends from downstream of the compressor $CCC_4$ to upstream of the compressor $CCC_1$. A computation module MCR receives, via the respective lines LD' to LR', data relative, on the one hand, to the flow rate D of gas flowing immediately downstream of the compressor $CCC_4$ and, on the other, to the recycle rate DR flowing through the line LR.

This computation module MCR transmits a signal representative of the difference between the two flow rates, which corresponds to the flow rate sent to the refrigerator, via a line $m_R$ to an additional regulation loop, assigned the numeral BRR.

The setpoint $C_R$ of this regulation loop corresponds to the maximum flow rate that the refrigerator can accept. Finally, the output $S_R$ of this loop BRR can be used to control the recycle valve V.

In service, when the flow rate sent to the refrigerator, which is equal to the difference $(D-D_R)$ between the outlet flow rate from $CCC_4$ and the possible recycle rate, reaches the maximum value $c_R$, the regulation loop BRR actuates the opening of the valve V. This makes it possible to increase the recycle rate, and hence to reduce the flow rate actually sent to the refrigerator, in order to guarantee the integrity of the latter.

It should be observed that this recycle operation tends to increase the reduced-reduced flow rate in two ways. In fact, this recycling causes an increase, not only of the mass flow rate, but also of the temperature of the gas sent to the unit 1, since gas at a higher temperature is recycled.

Figure 8:
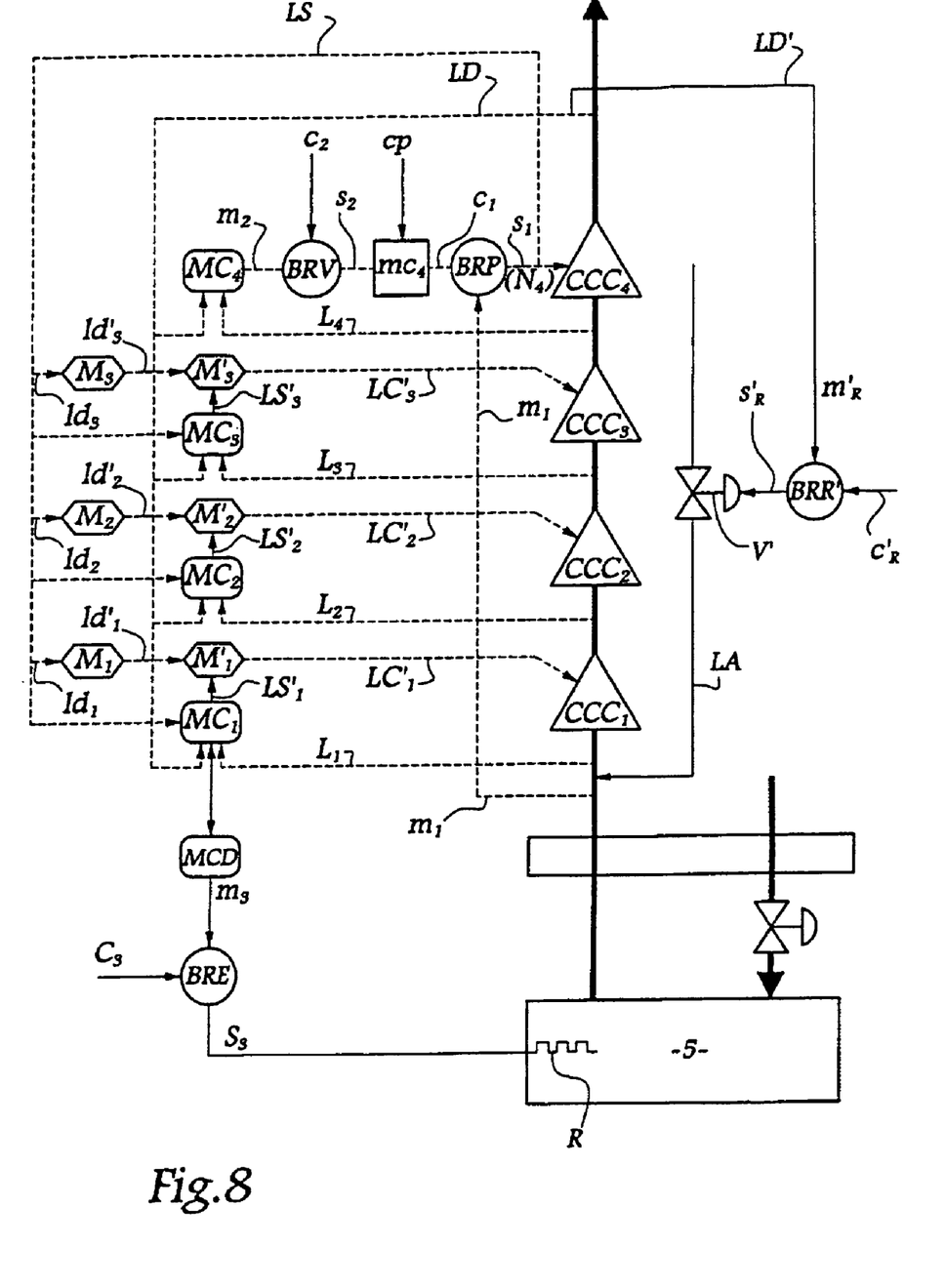

FIG. 8 shows an embodiment of the installation in FIG. 7.

In the installation in this FIG. 8, the recycle line is replaced by a line LA, conveying gas at ambient temperature, for example close to 300 K. Under these conditions, the measurement $m'_R$ of the regulation loop BRR' corresponds to the flow rate of gas flowing downstream of the compressor $CCC_4$.

In service, when this measured flow rate reaches the setpoint value $c'_R$, which still corresponds to the maximum flow rate accepted by the refrigerator, the loop BRR' actuates the opening of the recycle valve V', via the output s'R, thereby causing the injection of gas upstream of the compressor $CCC_1$.

This injection of gas at ambient temperature causes an increase in the temperature of the resulting mixture. This causes an increase in the reduced-reduced flow rate X, making it possible to deviate the operating points from the stalling curves, while maintaining the flow rate at an acceptable value as regards the refrigerator.

Figure 9:
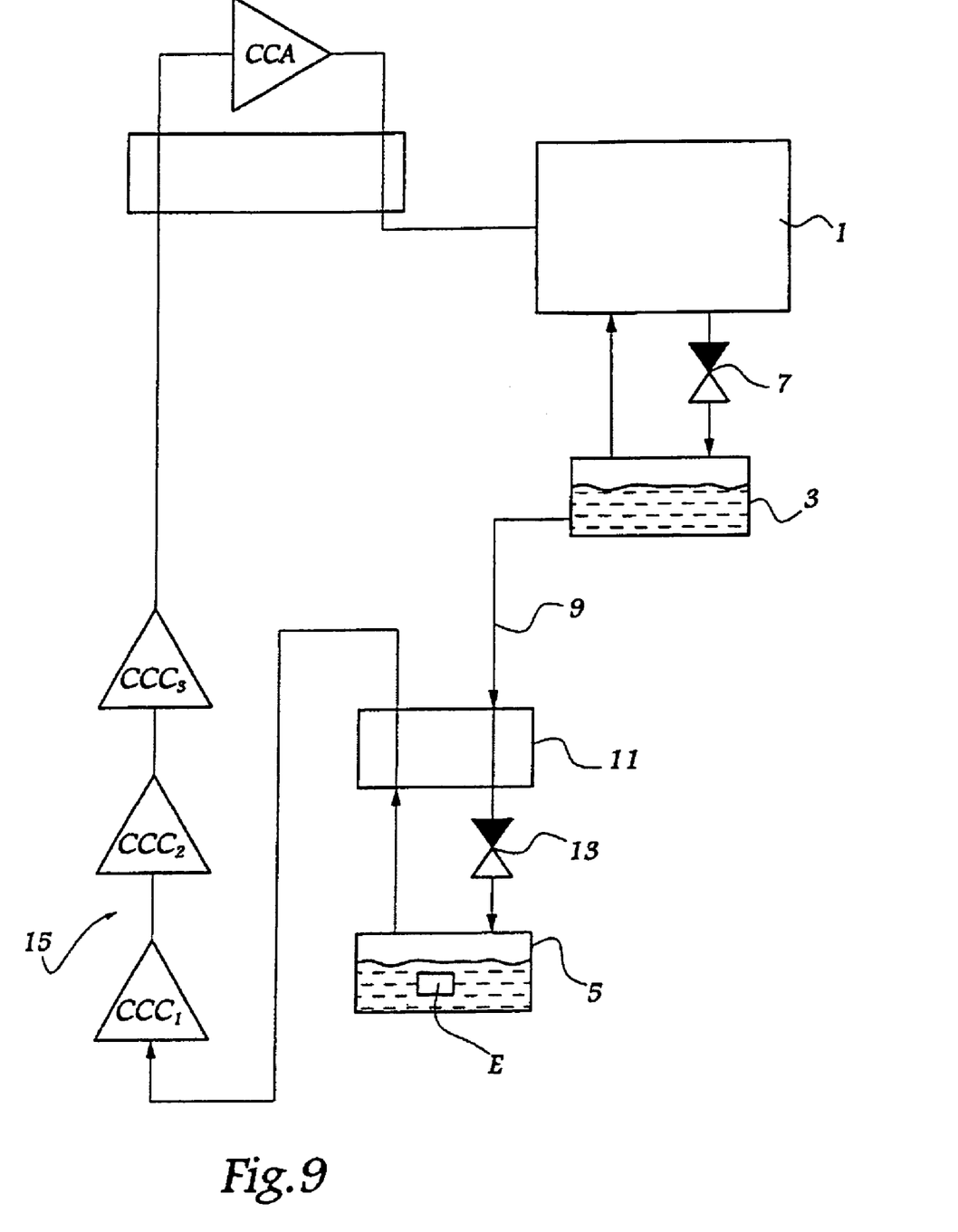

FIG. 9 shows another embodiment of the invention.

The compression therein is performed in a composite manner, by combining three compressors $CCC_1$ to $CCC_3$ operating at cryogenic temperature, as well as a compressor CCA, operating at ambient temperature. It must be understood that the number of compressors operating at cryogenic temperature or at ambient temperature can be chosen at random, as a variant.

Under these conditions, only the cryogenic compressors CCC are controlled in a manner according to the invention.

The invention is not limited to the examples described and shown.

Thus, the method of the invention can also be applied for the control of a single compressor.

In this eventuality, the measurement $m_1$ of the pressure regulation loop BRP corresponds to the suction pressure of this single compressor.

Furthermore, the control process explained above also applies to a startup phase, both of a train of compressors and of a single compressor.

Finally, the optimal path may be different from the one shown in FIG. 2. In particular, the distance between this optimal path and the stalling curve may not be proportional to the value of the compression ratio.

It will be understood that many additional changes in the details, materials steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for controlling a compression line, wherein:
   a) said compression line comprises at least one cryogenic centrifugal compressor, wherein said line is able to initially compress a gas to a low temperature and a low pressure; and
   b) said method comprises controlling the speed of rotation of said centrifugal compressor, wherein said method further comprises:
   1) selecting a predetermined curve, wherein:
      aa) said curve is in the form of a first parameter as a function of a second parameter;
      bb) said first parameter represents said speed of rotation of said centrifugal compressor; and
      cc) said second parameter represents the mass flow rate of said centrifugal compressor;
   2) regulating the speed of rotation of the centrifugal compressor located furthest downstream on said compression line as a function of:
      aa) the inlet pressure of the cryogenic centrifugal compressor located furthest upstream on said compression line; and
      bb) a variable pressure setpoint; and
   3) regulating said variable pressure setpoint as a function of the ratio of the instantaneous value of said first parameter for said downstream compressor to the theoretical value of said first parameter, as determined from said predetermined curve, for the instantaneous value of said second parameter.

2. The method of claim 1, wherein said gas comprises helium.

3. The method of claim 1, wherein said first parameter is the reduced-reduced speed.

4. The method of claim 1, wherein said second parameter is the reduced-reduced flow rate.

5. The method of claim 4, further comprising defining a second predetermined curve, wherein:
   a) the compression ratio is represented as a function of said reduced-reduced flow rate; and
   b) said second predetermined curve lies to the right of a stalling curve for said compressor.

6. The method of claim 5, wherein said second predetermined curve passes through the nominal operating point.

7. The method of claim 5, wherein for a given compression ratio, the distance between said second predetermined curve and said stalling curve is proportional to the value of said compression ratio.

8. The method of claim 5, further comprising supplying energy to all said compressors when:
   a) all said compressors have reached a nominal speed; and
   b) the distance between an instantaneous operating point and said stalling curve is less than a preset minimum value.

9. The method of claim 1, further comprising regulating said variable pressure setpoint by regulating an attenuation coefficient and by multiplying said attenuation coefficient by a fixed value in order to obtain said variable pressure setpoint.

10. The method of claim 9, wherein said fixed value is the desired pressure value at said inlet of said upstream compressor.

11. The method of claim 10, wherein said desired pressure value is about 30 mbar.

12. The method of claim 1, further comprising increasing said variable pressure setpoint when said instantaneous value of said first parameter for said downstream compressor is less than said theoretical value of said first parameter.

13. The method of claim 1, further comprising increasing said speed of rotation of said downstream compressor when said inlet pressure of said upstream compressor is greater than said variable setpoint.

14. The method of claim 1, further comprising determining an intermediate speed of rotation for at least one intermediate compressor, wherein:
   a) said intermediate speed of rotation corresponds to a theoretical intermediate speed of rotation; and
   b) said theoretical intermediate speed of rotation is determined as a function of the instantaneous value of the mass flow rate for said intermediate compressor.

15. The method of claim 14, further comprising applying an intermediate speed of rotation to at least one intermediate compressor, wherein said intermediate speed of rotation corresponds to the product of said downstream compressor's speed of rotation and a predetermined coefficient.

16. The method of claim 1, further comprising:
a) recycling a fraction of said gas from downstream of said compression line to upstream of said compression line through a recycle line;
b) sending at least part of said recycled gas to a liquefaction unit;
c) measuring the flow rate of said recycled gas; and
d) regulating said flow rate of said recycled gas as function of the flow rate of said gas entering the downstream portion of said compression line and a threshold flow rate, wherein said threshold flow rate corresponds to the flow rate of said recycled gas entering said liquefaction unit.

17. The method of claim 1, further comprising injecting an auxiliary gas into said compression line, wherein:
a) the temperature of said auxiliary gas is greater than that of said gas flowing in said compression line;
b) said injection is regulated as a function of the flow rate of the gas downstream in said compression line and of a threshold flow rate; and
c) said threshold flow rate corresponds to an acceptable flow rate of the system liquefaction unit.

18. The method of claim 17, wherein said temperature of said auxiliary gas is ambient temperature.

19. An apparatus which may be used for controlling a compression line, said apparatus comprising:
a) at least one downstream cryogenic centrifugal compressor;
b) at least one upstream cryogenic centrifugal compressor;
c) a first regulating means, wherein said first regulating means regulates the speed of rotation of said downstream compressor as a function of both the pressure at the inlet of said upstream compressor and a variable pressure setpoint; and
d) a second regulating means, wherein:
1) said second regulating means regulates said variable pressure set point as a function of the ratio of the instantaneous value of a first parameter for said downstream compressor to the theoretical value of said first parameter, as determined from a predetermined curve, for the instantaneous value of a second parameter;
2) said predetermined curve is a function of said first parameter to said second parameter;
3) said first parameter represents said speed of rotation of said downstream compressor; and
4) said second parameter represents the mass flow rate of said downstream compressor.

20. The apparatus of claim 19, wherein said first regulating means comprises:
a) a first regulation loop with a setpoint equal to said variable pressure setpoint;
b) a measurement equal to said inlet pressure of said upstream compressor; and
c) an output capable of regulating said speed of said downstream compressor.

21. The apparatus of claim 19 wherein said second regulating means comprises:
a) a second regulation loop with a set point equal to one;
b) a measurement equal to the ratio between said instantaneous and said theoretical values of said first parameter; and
c) an output capable of modifying the value of said variable pressure setpoint.

22. The apparatus of claim 21, wherein said output of said second regulation loop terminates in a multiplication module capable of multiplying the value of said output by a fixed value.

23. The apparatus of claim 22, wherein said fixed value is equal to the pressure desired at said upstream compressor's inlet.

24. The apparatus of claim 23, wherein said fixed value is about 30 mbar.

25. The apparatus of claim of claim 19, further comprising at least one computation module, wherein said computation module is capable, at any given time, of calculating for each said compressor:
a) the value of said instantaneous first parameter;
b) the value of said theoretical first parameter; and
c) the value of said instantaneous second parameter.

26. The apparatus of claim 19, further comprising an energy supply means for supplying energy to the vessel, wherein:
a) the distance, on a second predetermined curve, between the operating point and the stalling curve for said compressor is less than a preset minimum value;
b) said second predetermined curve is the compression ratio as a function of a reduced-reduced flow rate for said compressor; and
c) said second predetermined curve lies to the right of said stalling curve.

27. The apparatus of claim 26, further comprising an energy regulating loop, said energy regulating loop comprising:
a) a setpoint equal to said preset minimum value;
b) a measurement linked to a second computation module, wherein said module is capable, at any given time, of calculating the distance between said operating point and said stalling curve; and
c) an output linked to said energy supply means.

28. The apparatus of claim 19, further comprising:
a) a recycle line, wherein said recycle line recycles part of said gas from downstream to upstream on said compression line; and
b) a flow regulating means, wherein said flow regulating means regulates the gas flow in said recycle line as a function of:
1) the actual flow rate downstream of said compression line; and
2) a threshold flow rate.

29. The apparatus of claim 28, wherein said flow regulating means comprises:
a) a recycle flow regulating loop with a setpoint equal to said threshold flow rate;
b) a measurement corresponding to the instantaneous value of said actual flow rate downstream of said compression line; and
c) an output linked to an open-shut member on said recycle line.

30. The apparatus of claim 29, wherein said open-shut member comprises a valve.

31. The apparatus of claim 19, further comprising:
a) an injection line for injecting an auxiliary gas into said compression line, wherein said auxiliary gas is at a temperature greater than the temperature of the gas in said compression line; and
b) an injection regulating means, wherein said injection regulating means regulates the injection of said auxiliary gas as function of:
1) the actual flow rate downstream of said compression line; and
2) a threshold flow rate.

32. The apparatus of claim 31, wherein said injection regulation means comprises:
   a) an injection regulating loop with a setpoint equal to the value of said threshold flow rate;
   b) a measurement corresponding to the instantaneous value of said actual flow rate downstream of said compression line; and
   c) an output linked to an open-shut member on said injection line.

33. The apparatus of claim 32, wherein said open-shut member is a valve.

34. An apparatus which may be used for refrigeration of a liquefied gas at a low pressure and a low temperature, said apparatus comprising:
   a) a vessel, wherein said vessel contains a two-phase fluid at a low temperature and a low pressure;
   b) a liquefaction unit for the liquefaction of said fluid;
   c) a feed line for said fluid, wherein:
      1) said feed line comprises an expansion means for expanding said liquefied fluid; and
      2) said feed line connects said liquefaction unit to said vessel; and
   d) a compression line connecting said vessel to said liquefaction unit, wherein said compression line comprises:
      1) at least downstream one cryogenic centrifugal compressor;
      2) at least one upstream cryogenic centrifugal compressor; and
      3) a control means for controlling said centrifugal compressor, wherein said control means comprises:
         aa) a first regulating means, wherein said first regulating means regulates the speed of rotation of said downstream compressor as a function of both the pressure at the inlet of said upstream compressor, and a variable pressure setpoint; and
         bb) a second regulating means, wherein:
            i) said second regulating means regulates said variable pressure set point as a function of the ratio of the instantaneous value of a first parameter for said downstream compressor to the theoretical value of said first parameter, as determined from a predetermined curve, for the instantaneous value of a second parameter;
            ii) said predetermined curve is a function of said first parameter to said second parameter;
            iii) said first parameter represents said speed of rotation of said downstream compressor; and
            iv) said second parameter represents the mass flow rate of said downstream compressor.

* * * * *